(12) United States Patent
Guering

(10) Patent No.: US 9,272,775 B2
(45) Date of Patent: Mar. 1, 2016

(54) COMPACT IMPROVED AIRCRAFT LANDING GEAR

(71) Applicant: Bernard Guering, Montrabe (FR)

(72) Inventor: Bernard Guering, Montrabe (FR)

(73) Assignee: Airbus Operations (S.A.S.), Toulouse (FR)

( * ) Notice: Subject to any disclaimer, the term of this patent is extended or adjusted under 35 U.S.C. 154(b) by 421 days.

(21) Appl. No.: 13/632,812

(22) Filed: Oct. 1, 2012

(65) Prior Publication Data

US 2013/0112808 A1     May 9, 2013

(30) Foreign Application Priority Data

Sep. 30, 2011 (FR) .................................... 11 58810

(51) Int. Cl.
| | |
|---|---|
| *B64C 25/14* | (2006.01) |
| *B64C 25/20* | (2006.01) |
| *B64C 25/10* | (2006.01) |
| *B64C 25/22* | (2006.01) |

(52) U.S. Cl.
CPC .................. *B64C 25/20* (2013.01); *B64C 25/10* (2013.01); *B64C 25/14* (2013.01); *B64C 25/22* (2013.01)

(58) Field of Classification Search
CPC ....................................................... B64C 25/14
USPC ............................. 244/102 R, 102 A, 102 SS
See application file for complete search history.

(56) References Cited

U.S. PATENT DOCUMENTS

| | | | |
|---|---|---|---|
| 1,011,026 A | 12/1911 | Carpenter | |
| 2,413,986 A * | 1/1947 | Martin ...................... | 244/102 R |
| D149,798 S | 6/1948 | Crawford | |
| 3,599,510 A | 8/1971 | Scott et al. | |
| 3,675,880 A | 7/1972 | Koch | |
| 4,568,045 A * | 2/1986 | Mayer ........................ | 244/102 R |
| 4,984,755 A * | 1/1991 | Derrien .................... | 244/102 SS |
| 5,100,083 A * | 3/1992 | Large et al. ............. | 244/102 SS |
| 5,195,804 A | 3/1993 | Stolle | |
| 5,314,143 A | 5/1994 | Luria | |
| 5,544,842 A | 8/1996 | Smith | |
| 6,025,831 A | 2/2000 | Gardiner | |
| D442,958 S | 5/2001 | Funakoshi et al. | |

(Continued)

FOREIGN PATENT DOCUMENTS

| | | |
|---|---|---|
| EP | 1 693 248 | 8/2006 |
| FR | 2 900 634 | 11/2007 |

(Continued)

OTHER PUBLICATIONS

French Search Report for Application No. PCT/FR2012/050064 dated Apr. 18, 2012.

(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

A breaker strut of an aircraft landing gear, including means to adjust the length of at least one of its lower and upper portions and/or a space allowing a nesting of the lower and upper portions in the folded position of the strut. A landing gear including such a strut and/or retraction means including two slider-crank mechanisms which are phase shifted by a non-zero angle φ allowing a reduction of the variations of torque C applied to the undercarriage of the gear as it moves between the lowered and raised states of the latter.

20 Claims, 10 Drawing Sheets

(56) References Cited

U.S. PATENT DOCUMENTS

| | | | |
|---|---|---|---|
| 6,305,643 | B1 | 10/2001 | Sankrithi |
| 6,354,152 | B1 | 3/2002 | Herlik |
| 6,454,208 | B1 | 9/2002 | Nervig et al. |
| 6,464,169 | B1 | 10/2002 | Johnson et al. |
| 6,824,100 | B1 * | 11/2004 | Cheetham ............ 244/102 R |
| 6,903,720 | B1 | 6/2005 | Glithero |
| 6,910,736 | B2 | 6/2005 | White |
| 7,320,503 | B2 | 1/2008 | Eysing |
| 7,621,481 | B2 * | 11/2009 | Hershberger et al. ..... 244/102 A |
| 7,784,736 | B2 | 8/2010 | Guering et al. |
| 7,784,871 | B2 | 8/2010 | Cochran |
| 7,909,402 | B2 | 3/2011 | Chu et al. |
| 7,942,366 | B2 * | 5/2011 | Waide ................ 244/102 SS |
| 8,186,620 | B2 * | 5/2012 | Luce et al. .......... 244/102 SS |
| 8,602,352 | B2 * | 12/2013 | Keller et al. ........... 244/102 A |
| 9,114,880 | B2 | 8/2015 | Guering |
| 2004/0256899 | A1 | 12/2004 | Moore et al. |
| 2005/0133308 | A1 | 6/2005 | Reysa et al. |
| 2005/0230540 | A1 | 10/2005 | Harrington et al. |
| 2006/0255635 | A1 | 11/2006 | Iijima et al. |
| 2007/0164152 | A1 | 7/2007 | Anderson et al. |
| 2008/0149769 | A1 | 6/2008 | Koch et al. |
| 2008/0230650 | A1 * | 9/2008 | Meyer et al. ............ 244/100 R |
| 2009/0294394 | A1 | 12/2009 | Girlich |
| 2010/0078533 | A1 | 4/2010 | Bopp et al. |
| 2010/0085695 | A1 | 4/2010 | Vicich et al. |
| 2010/0085710 | A1 | 4/2010 | Bopp et al. |
| 2010/0090868 | A1 | 4/2010 | Hall |
| 2010/0140397 | A1 | 6/2010 | Wassenhove |
| 2010/0308166 | A1 | 12/2010 | Bovelli |
| 2012/0037752 | A1 * | 2/2012 | Collins ................ 244/102 SL |
| 2014/0042272 | A1 | 2/2014 | Guering |
| 2014/0159450 | A1 | 6/2014 | Guering |
| 2014/0168907 | A1 | 6/2014 | Guering |

FOREIGN PATENT DOCUMENTS

| | | |
|---|---|---|
| FR | 2 910 675 | 7/2008 |
| FR | 2 939 766 | 6/2010 |
| GB | 2 131 779 | 11/1983 |
| WO | WO 02/102203 | 12/2002 |
| WO | WO 2006/101417 | 9/2006 |
| WO | WO 2010/069923 | 6/2010 |
| WO | WO 2012/095605 | 7/2012 |
| WO | WO 2012/110725 | 8/2012 |
| WO | WO 2012/149978 | 11/2012 |

OTHER PUBLICATIONS

French Search Report for Application No. FR 1151346 dated Sep. 12, 2011.

Preliminary Search Report for Application No. FR 1262067 dated Aug. 9, 2013.

Preliminary Search Report for Application No. FR 1262144 dated Sep. 2, 2013.

French Search Report for FR 1261341 dated Oct. 2, 2013.

French Search Report and Written Opinion for Application No. FR 050189 dated Jan. 10, 2014.

Non-Final Office Action for U.S. Appl. No. 14/090,882 dated May 27, 2014.

Interview Summary for U.S. Appl. No. 14/090,882 dated Oct. 3, 2014.

Non-Final Office Action for U.S. Appl. No. 14/090,882 dated Dec. 18, 2014.

DS3695, 'Application Note 454 Automotive Multiplex Wiring', Apr. 1997.

Notice of Allowance for U.S. Appl. No. 14/090,882 dated May 11, 2015.

Non-Final Office Action for U.S. Appl. No. 13/985,024 dated Jun. 24, 2015.

* cited by examiner

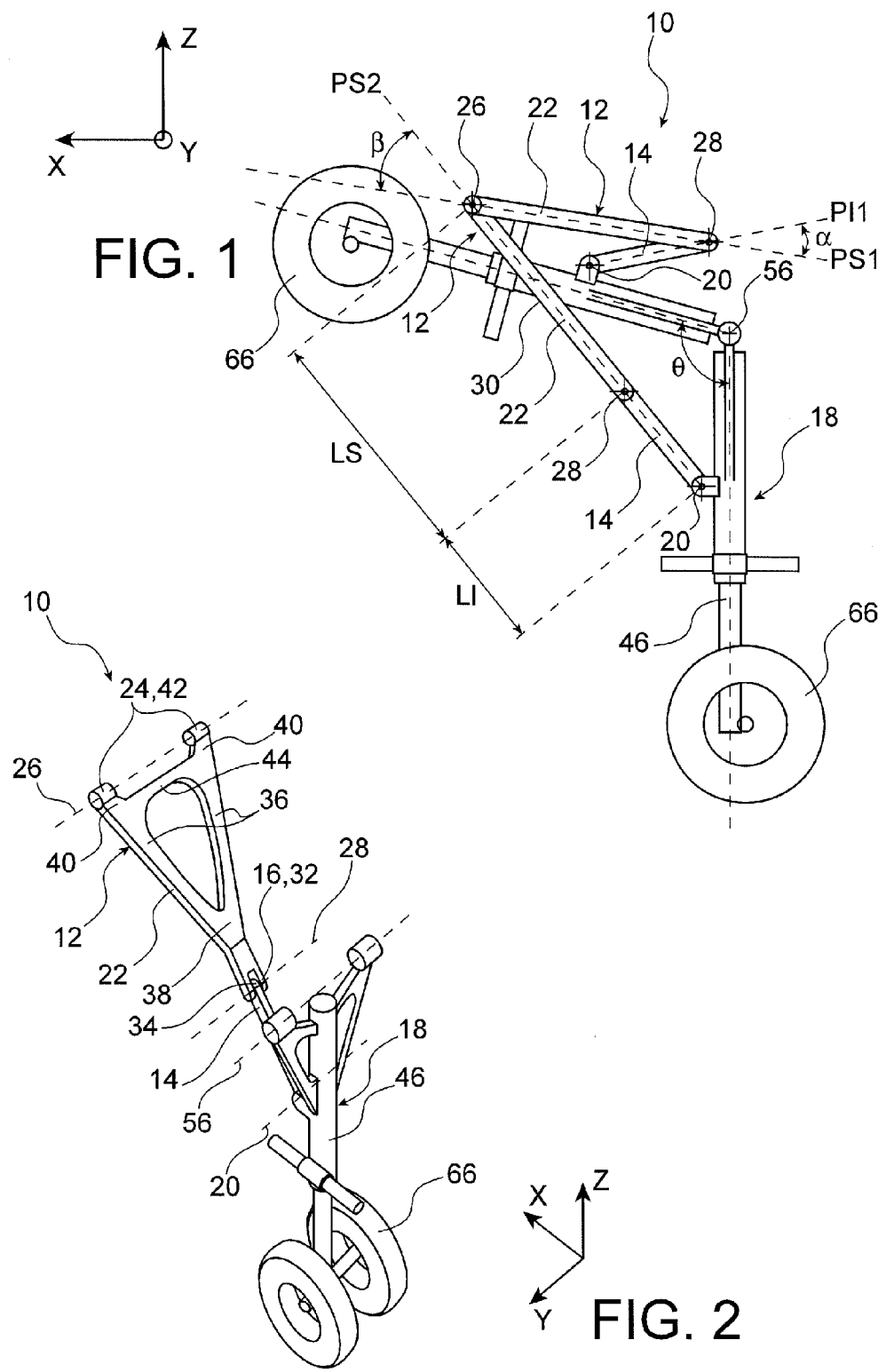

COMPACT IMPROVED AIRCRAFT LANDING GEAR

TECHNICAL FIELD

The present invention relates generally to the field of aircraft landing gear, including at least one undercarriage which can be moved between a raised and lowered state.

The invention concerns more specifically, but not exclusively, a forward landing gear together with a nose section of an aircraft including a gear compartment accommodating such a landing gear.

The invention applies to all types of aircraft.

BACKGROUND

The nose section of aircraft has been subject to many developments seeking to optimise its mass, volume, cost, safety, ease of manufacture and maintenance, etc. Such a nose section is known, for example, from documents FR 2 910 875 and U.S. Pat. No. 7,784,736.

Despite the existence of many embodiments, it is desirable to reduce further the volume of the landing gear compartment of the nose section.

The volume of a landing gear compartment is determined notably by the compactness of the landing gear in its raised state, which compactness depends notably on the geometry of the breaker strut of the landing gear. Such a breaker strut is a well-known element intended to stabilise the landing gear in its lowered state.

As illustrated by FIGS. 1 to 4, which partially represent a landing gear 10 of a known type, breaker strut 12 is generally formed from two portions, the lower one of which 14 includes first means 16 of articulated connection to undercarriage 18 of the landing gear by a first hinge axis 20, and the upper one of which 22 includes first means 24 of articulated connection to the aircraft by a second hinge axis 26. These two strut portions are connected to one another along a third hinge axis 28 which is parallel to abovementioned lines 20 and 26. Both portions 14 and 22 can thus be moved relative to one another between a deployed position (FIG. 2), in which lower portion 14 is positioned facing upper portion 22 relative to abovementioned third line 28, and in which first line 20 is roughly contained in a plane defined by second line 26 and third line 28, and a folded position (FIGS. 3 and 4), in which lower portion 14 is folded towards a lower face 30 of upper portion 22. It should be noted that FIG. 1 illustrates both raised state, 54, and lowered state, 52, of landing gear 10.

Lower portion 14 is generally formed from a connecting rod, whereas upper portion 22 is formed from an A-shaped structure, the apex of which includes a fork joint 32, in which an upper end 34 of lower portion 14 is connected in articulated fashion (FIG. 2). This structure includes two oblique arms 36, each of which has a lower end 38 connected to fork joint 32 and a facing end 40 having a sleeve 42 forming part of first means 24 of articulated connection of upper portion 32. In addition it is preferable, for reasons of rigidity, that both oblique arms 36 should be connected to one another by a transverse arm 44 close to their respective ends 40 having abovementioned first means 24 of articulated connection.

The compactness of breaker strut 12 in its folded position depends essentially on angle α between planes PS1 and PI1 in which the upper portion 22 and lower portion 14 are contained respectively in the folded position (FIG. 1), and on angle β between plane PS2 in which upper portion 22 is contained in the deployed position, and plane PS1 in which this upper portion 22 is contained in the folded position. The compactness of the breaker strut 12 in the folded position also depends on the ratio of the respective lengths LI and LS of the lower portion 14 and upper portion 22. It should be noted that the plane in which lower portion 14 is contained is defined as the plane containing first hinge axis 20 and third hinge axis 28, whereas the plane in which upper portion 22 is contained is defined as the plane containing second hinge axis 26 and third hinge axis 28.

And, as FIG. 4 illustrates more clearly, angle α between lower portion 14 and upper portion 22 in the folded position is limited by fork joint 32 to a minimum value which is typically equal to approximately 20 degrees. Generally, abovementioned angle α can be limited not only by fork joint 32, but also by the risk of a collision between upper portion 22 and leg 46 of undercarriage 18 in the raised state of undercarriage 10. As is shown by FIG. 3, this risk of collision concerns in particular transverse arm 44 and the region of mutual connection of both oblique arms 36 of upper portion 22.

Angle β between plane PS1 and plane PS2, and also respective lengths LI and LS of lower portion 14 and upper portion 22, are determined so as to allow a control linkage of the landing gear which has no locking points. Such a constraint habitually imposes minimum values respectively for angle β and for length LS of upper portion 22.

Furthermore, the volume of a landing gear compartment is also determined by the compactness of the landing gear retraction means. Retraction means must be understood to mean the mechanism enabling the undercarriage to be raised from its lowered state to its raised state.

FIG. 5 illustrates in a very simplified manner a nose section 48 of a conventional aircraft, and more specifically compartment 50 of forward landing gear 10, together with undercarriage 18 of this gear in its lowered state 52 and raised state 54, and in an intermediate state 53.

As it is raised, undercarriage 18 is made to rotate around its pivot axis 56, and is subjected principally to two moments which are combined, but which change in opposition to one another. The first moment results from the weight of the undercarriage, applied to its centre of gravity 58, and represented symbolically by arrow 60, and from corresponding leverage 62. The second moment results from the effects 64 of the relative wind, which essentially affects wheel 66 of undercarriage 18, and from corresponding leverage 68. It should be noted that in FIG. 5 weight 60, force 64 due to the relative wind and associated leverages 62 and 68 are represented only for the intermediate state of landing gear 10.

In lowered state 52 the second moment due to the relative wind is at its maximum due to corresponding large leverage 68, whereas the first moment associated with the weight is zero. Conversely, in raised state 54 the first moment associated with the weight is at its maximum due to corresponding large leverage 62, whereas the second moment due to the relative wind is zero. Between these two states the two moments change in opposition to one another, and producing a combined effect, such that the total moment applied to the undercarriage is roughly constant as it moves.

FIG. 5 also illustrates the retracting means of gear 10, which operate according to a slider-crank mechanism including a crank 70 coupled to leg 46 of undercarriage 18, together with a linear actuator 72 which includes a rod 74 coupled to crank 70, and a cylinder 76 connected to roof 78 of gear compartment 50.

FIGS. 6a, 6b and 6c illustrate the abovementioned retraction means at a larger scale, and correspond respectively to the raised, intermediate and lowered states of landing gear 10.

As is clear from these FIGS. 6a to 6c, the retraction torque of undercarriage 18 varies as the undercarriage rotates. This torque is, indeed, equal to the product of the generally constant force of the actuator, represented symbolically by arrow 80, and the variable associated leverage represented symbolically by arrow 82. More specifically, this retraction torque is minimal in the extreme positions corresponding to the raised and lowered states of the gear illustrated by FIGS. 6a and 6c respectively, and this torque is highest in the intermediate position of FIG. 6b.

As a consequence, this configuration of the retraction means does not appear to be optimal, bearing in mind the roughly constant forces which these retraction means must oppose, as explained above. This generally leads the retraction means, and notably actuator 72, to be dimensioned such that force 80 of the latter is sufficient to exceed the forces due to the weight of the undercarriage and to the relative wind, even when leverage 82 associated with actuator 72 is minimal, i.e. in the undercarriage's raised and lowered states. This results in undesirable excess mass and cost.

In addition, as shown by FIG. 6c, rod 74 of actuator 72 comes close to pivot axis 56 of undercarriage 18 when landing gear 10 is in its lowered state. This proximity of rod 74 and pivot axis 56 is more pronounced the greater the angular displacement 6 traversed by undercarriage 18 between its raised and lowered states (FIG. 5). In practice, this results in a limitation of this angular displacement to an angle value close to approximately 105 degrees, above which value rod 74 of actuator 72 would come into collision with a pivot element of undercarriage 18.

With the aim of optimising aircraft it is generally desirable to make compartment 50 of forward landing gear 10 as close as possible to forward end 84 of the aircraft (FIG. 5). However, such proximity requires that angular displacement θ followed by undercarriage 18 between its raised and lowered states is increased above the abovementioned limiting value. This angular displacement must be increased still further when undercarriage 18 is of the retractable type, i.e. where it becomes shorter as the undercarriage is raised. This type of undercarriage is, however, of great interest in terms of increased compactness.

In addition, the roughly vertical positioning of actuator 72 has a detrimental effect on the vertical compactness of gear compartment 50.

In addition, positioning this actuator 72 in a direction close to the horizontal direction would have a detrimental effect on the lengthways compactness of gear compartment 50. Indeed, the slider-crank mechanism must not pass through a dead centre, i.e. a state in which leverage 82 associated with actuator 72 is zero as undercarriage 18 is raised, since such a situation would clearly lead the undercarriage to lock. As a consequence, in a configuration in which actuator 72 extends roughly horizontally, as illustrated in FIG. 7, crank 70 necessarily traverses a vertical plane PV passing through pivot axis 56, and continues well beyond this plane PV, requiring that the position of rear wall 86 of gear compartment 50 is moved towards the rear.

SUMMARY

One aim of the invention is notably to provide a simple, economic and efficient solution to at least some of these problems, allowing the abovementioned disadvantages to be at least partly avoided.

To this end, according to a first aspect of the invention, the object of the latter is a breaker strut for an aircraft landing gear, formed of two portions, wherein a lower one of said two portions includes first hinge means for articulated connection to a landing gear undercarriage about a first hinge axis, wherein an upper one of said two portions includes first hinge means for articulated connection to at least one structural aircraft element about a second hinge axis, and wherein said two portions are connected to one another by second respective hinge means about a third hinge axis parallel to said first and second hinge axes, such that the lower and upper portions can be moved relative to one another between a deployed position, in which said lower and upper portions are positioned either side of said third hinge axis, and in which said first hinge axis is roughly contained in a plane defined by the second and third hinge axes, and a folded position, in which the lower portion is folded towards a lower face of said upper portion.

According to the first aspect of the invention, at least one of the lower and upper portions of the breaker strut includes means of mutual attachment of its first and second hinge means, which allow the distance separating said first and second hinge means to be modified.

Such an adjustment of the distance separating the first and second hinge means of the abovementioned portion of the strut enables the range of possible kinematics of the strut to be increased, and in particular makes possible the use of ratios of lengths of the lower and upper portions of the strut which led to locking with the breaker struts of known types.

The invention thus allows, in particular, closer proximity between, firstly, the hinge axis of connection of the upper portion of the breaker strut to the aircraft and, secondly, the leg of the landing gear fitted with this strut, in the raised state of this landing gear.

The invention thus generally makes possible a more compact breaker strut in the folded position, and therefore a smaller volume of the gear compartments required to accommodate such a strut.

In a preferred embodiment of the invention, the means of mutual attachment are designed to lock and unlock, when so ordered, the distance separating the first and second hinge means.

The means of mutual attachment can thus be kept in the mode in which the distance separating the first and second hinge means is locked, for as long as this does not lead the strut's kinematic to lock, and then be switched into the mode in which the abovementioned distance is unlocked when nearing a locking point, to enable the strut to continue its movement beyond this point.

Maintaining the means of attachment in locked mode as indicated above can in certain cases facilitate movement of the strut.

In the preferred embodiment of the invention, the means of mutual attachment include at least one sliding rod, together with controlled locking/unlocking means for preventing/allowing motion of said sliding rod.

The abovementioned sliding rod is preferably part of an electrically controlled hydraulic linear actuator (i.e. cylinder), in which case said controlled locking/unlocking means can be designed so as to put the chambers of the actuator into communication in unlocking mode, and to prevent any exchange of fluid between each of said chambers and the exterior in locking mode.

Such controlled locking/unlocking means can be of conventional design, including, for example, one or more valves designed to open and shut alternately a hydraulic circuit connecting the two chambers of the abovementioned actuator to one another.

As a variant, the linear actuator may be of pneumatic type.

As another variant, said linear actuator can be replaced by other types of arrangements. For example, the sliding rod can be mounted in a tube so as to be able to slide in relation to said tube, without any hydraulic or pneumatic fluid therein. In this case, the controlled locking/unlocking means may include a movable stop arranged to alternately move in the path of the sliding rod and out of said path.

In the preferred embodiment of the invention, the means of mutual attachment include two sliding rods connected respectively to the sides of said lower portion together with controlled locking/unlocking means for preventing/allowing motion of said sliding rods.

A space extends advantageously between said two sliding rods, which space enables said lower portion to be at least partially accommodated in its folded position.

The use of two sliding rods positioned either side of the lower portion of the strut enables the abovementioned space to be created to accommodate the lower portion, and makes possible a symmetrical geometry of the upper portion fitted with the abovementioned sliding rods.

In addition, the presence of such a space forming a recess for the lower portion makes it possible to save additional space, by allowing a reduction of the minimum folding angle of the lower portion towards the upper portion, as will be shown more clearly in what follows.

It should be noted that the abovementioned space is not limited to a space enabling the lower portion to be accommodated in its entirety, and can therefore be a space which enables only a portion of the lower portion to be accommodated, without going beyond the scope of the invention.

The two sliding rods are preferably part respectively of two linear actuators, such as electrically controlled hydraulic linear actuators for example, between which said space extends.

In the preferred embodiment of the invention, the portion of the breaker strut which includes said means of mutual attachment is the upper portion of this strut.

Experience has shown that the best results are obtained, at least with certain types of kinematics, when the length adjustment concerns the upper portion of the strut.

As a variant, this length adjustment can however concern the lower portion, or even both portions of the strut, without going beyond the scope of the present invention.

According to a second aspect of the present invention, the object of the latter is a breaker strut for an aircraft landing gear, formed of two portions, wherein a lower one of said two portions includes first hinge means for articulated connection to a landing gear undercarriage about a first hinge axis, wherein an upper one of said two portions includes first hinge means for articulated connection to at least one structural aircraft element about a second hinge axis, and
wherein said two portions are connected to one another by second respective hinge means about a third hinge axis parallel to said first and second hinge axes, such that the lower and upper portions can be moved relative to one another between a deployed position, in which said lower and upper portions are positioned either side of said third hinge axis, and in which said first hinge axis is roughly contained in a plane defined by the second and third hinge axes, and a folded position, in which the lower portion is folded towards a lower face of said upper portion.

According to the second aspect of the invention, the upper portion defines a space enabling the lower portion to be accommodated in folded position, such that the first hinge axis is contained in said plane.

The possibility of folding the lower portion towards the upper portion to the point that the first hinge axis is contained in the plane defined by the second and third hinge axes enables the compactness of the breaker strut to be optimised in folded position. Indeed, both portions of the strut are thus nested one within the other, such that the thickness of the strut is thus minimised.

Use of a strut kinematic enabling such a folded position to be attained may require the use of specific means in order to overcome any locking points. In this case, these means may be of all appropriate types in connection with the second aspect of the present invention, and preferably take the form of a strut portion having means of attaching its first and second hinge means allowing the distance separating these first and second hinge means to be modified, as proposed above in connection with the first aspect of the invention.

In the preferred embodiment of the invention, the upper portion includes two structures with an overall triangular shape connected respectively to each side of the lower portion, and each including, at a lower apex of the triangle, said second hinge means for connection to the lower portion and, at two upper apexes of the triangle, said first hinge means for connection to said structural aircraft element.

Such structures have the advantage of excellent rigidity, which may be sufficient to allow use of these structures in a configuration including only relatively lightweight means of rigid attachment of said structures to one another, or even without any rigid attachment of said structures, as will be shown more clearly in what follows. A rigid attachment is understood to mean an attachment other than the attachment transmitted by the shafts of the first and second hinge means of the upper portion.

In the preferred embodiment of the invention, each of said structures includes an arm delimiting said space, and extending in a direction orthogonal to said hinge axes so as to connect the abovementioned lower apex to one of the two other apexes of the triangle.

In this case, the triangle includes a right angle at the end of said arm opposite the lower apex of the triangle.

Such an arm enables the abovementioned space forming a recess for the lower portion to be given a rectilinear geometry. A geometry of this type is suitable, for example, for a lower portion taking the form of a connecting rod, and such a lower portion is proposed in the preferred embodiment of the invention.

Furthermore, the upper portion preferably includes a flange connecting said structures to one another.

Such a flange enables the rigidity of the upper portion to be optimised.

This flange advantageously extends in an upper face of the upper portion, and delimits said space.

Since the lower portion of the strut is inserted in the abovementioned space through the lower face of the upper portion of this strut, the configuration of the flange on the upper face of this upper portion therefore enables any interference to be prevented between the flange and the lower portion of the strut, such that the flange may be positioned in the most appropriate region of the upper portion.

As a variant, said space may traverse the upper portion such that it emerges in the lower face and the upper face of this upper portion, and this space may extend along the entire length of the abovementioned arm such that it separates the abovementioned structures.

In this case, these two structures may have no rigid attachment between them, in the sense defined above.

The invention also concerns a landing gear for aircraft, including at least one undercarriage which can be moved between a raised state and a lowered state, together with a breaker strut according to the first and/or second aspect of the invention, of which the first hinge means of said lower portion of said breaker strut are connected to the abovementioned undercarriage.

As explained above, such a landing gear has the advantage that it has a breaker strut which is particularly compact in the folded position, i.e. in the raised state of the landing gear.

In relation thereto, in the preferred embodiment of the invention, said breaker strut is compliant simultaneously with the first and the second aspect of the invention.

The invention also concerns an aircraft landing gear compartment accommodating a landing gear of the type described above, and including at least one structural element to which the first hinge means of the upper portion of the breaker strut are connected.

As explained above, such a gear compartment can have a particularly small volume, and is therefore very appropriate for installation close to the front end of an aircraft nose cone.

In the preferred embodiment of the invention, the first hinge means of the upper portion of the breaker strut are connected to two opposite sides of the abovementioned gear compartment.

As a variant, the first hinge means of the upper portion of the breaker strut can be connected to other structural aircraft elements.

According to a third aspect of the present invention, one object of the latter is a landing gear for aircraft, including an undercarriage and means of retraction of the latter, designed to cause the undercarriage to rotate around a pivot axis, wherein said means of retraction include a first crank securely attached to the undercarriage, and a first linear actuator which includes a first portion coupled to the first crank, and a second portion movable relative to the first portion and having means of attachment to a structural aircraft element, such that the first crank and the first actuator form part of a first slider-crank mechanism.

According to the third aspect of the invention, said means of retraction include a second crank securely attached to the undercarriage and offset, relative to the first crank, by a non-zero angle φ around said pivot axis, together with a second linear actuator which includes a first portion coupled to the second crank, and a second portion which is able to move relative to the first portion, and having means of attachment to a structural aircraft element, such that the second crank and the second actuator form part of a second slider-crank mechanism.

The mutual angular offset of the two cranks must naturally be understood as being an angular offset between a crank pin of the second crank and a crank pin of the first crank.

If both linear actuators are installed appropriately in an aircraft gear compartment, such an angular offset allows two phase-shifted slider-crank mechanisms to be obtained. An example of such an appropriate installation will be described in what follows.

The use of two phase-shifted slider-crank mechanisms has the advantage that the respective dead centres of these mechanisms do not coincide. This makes possible the use of configurations in which at least one of the slider-crank mechanisms passes through its dead centre during retraction of the undercarriage, without any risk that the latter may lock. This results in a possibility of making the gear compartment containing such a landing gear more compact, as will be more clearly shown in what follows.

More generally, the use of two phase-shifted slider-crank mechanisms enables the amplitude of the variations of the torque applied to the undercarriage by its retraction means to be reduced, as a consequence of the addition of the two phase-shifted leverages respectively associated with the two slider-crank mechanisms. The invention thus makes possible the use of actuators of lower power ratings than the required power rating of single actuators of landing gears of known types, and which are therefore generally less expensive. These actuators can also be of relatively small dimensions compared to the single actuators of landing gears of known types, such that the invention according to its third aspect also allows greater compactness.

It is to be noted that the first portion of each linear actuator may be a movable rod of the actuator while the second portion thereof may be a cylinder body of the actuator, or conversely.

The first and second cranks are preferably positioned either side of said undercarriage.

This enables the forces transmitted to the undercarriage to be balanced optimally, and maximum advantage to be thus taken of the two slider-crank mechanisms.

The first portion of each of the abovementioned actuators preferentially takes the form of a rod of the actuator, whereas the second portion of each of these actuators takes the form of a cylinder of the actuator. The reverse is also possible, as a variant.

In the preferred embodiment of the invention, the first portion of each of the linear actuators is directly connected to the corresponding crank about a hinge axis parallel to said pivot axis, and the means of attachment of the second portion of each of the actuators form means of articulated connection of the second portion of the actuator about a hinge axis parallel to said pivot axis.

In this particularly simple configuration, the operation of the undercarriage's retraction means is done with each of the actuators describing a rotational movement in a plane orthogonal to the abovementioned pivot axis, i.e. a vertical plane.

As a variant, each of said slider-crank mechanisms may include an additional connection rod the ends of which are connected respectively to the first portion of the linear actuator and to the corresponding crank. In this case, the second portion of each of the linear actuators may be immobile relative to the landing gear compartment containing the landing gear.

In the preferred embodiment of the invention, the landing gear also includes a breaker strut according to the first and/or second aspect of the invention.

The landing gear thus allows optimal compactness of the gear compartment in which it is contained.

According to the third aspect of the present invention, another of its objects is an aircraft landing gear compartment accommodating a landing gear including an undercarriage and means of retraction of the latter designed to drive the undercarriage in a rotational movement around a pivot axis which is fixed relative to the gear compartment between a raised state and a lowered state, wherein the means of retraction include a first crank securely attached to the undercarriage and a first linear actuator which includes a first portion coupled to the first crank, and a second portion able to move relative to the first portion and having means of attachment intended to attach the second portion to a first structural element of the landing gear compartment, such that the first crank and the first linear actuator form part of a first slider-crank mechanism.

According to the third aspect of the invention, said means of retraction include a second crank securely attached to the undercarriage, together with a second linear actuator which includes a first portion coupled to the second crank, and a second portion able to move relative to said first portion and having means of attachment intended to attach the second portion to a second structural element of the landing gear compartment, such that the second crank and the second linear actuator form part of a second slider-crank mechanism.

Moreover, said means of retraction are arranged such that the first and second slider-crank mechanisms are phase-shifted relative to one another by a non-zero angle $\phi$.

The mutual phase shift of the two slider-crank mechanisms may be obtained by an angular offset between the respective cranks of these two mechanisms, as explained above. With this regard, the gear compartment preferably includes a landing gear of the type described above.

As a variant, or additionally, such a phase shift may be obtained by installing the two actuators aligned in two different directions.

In the preferred embodiment of the invention, the two linear actuators are similar, and the second respective portions of the linear actuators are connected to the abovementioned aircraft structural elements by a common hinge axis.

In this case, the mutual phase shift of the two slider-crank mechanisms essentially results from an angular offset between the abovementioned cranks.

In the preferred embodiment of the invention, the common hinge axis defines, with said pivot axis, a plane inclined at an angle of more than 45 degrees relative to the vertical direction corresponding to a general direction of the undercarriage in its lowered state.

In other words, each of the two linear actuators extends in a direction closer to the horizontal direction than to the vertical direction.

This allows the height of the gear compartment to be reduced, as explained above.

In the preferred embodiment of the invention, each of the first and second cranks traverses the abovementioned plane as the undercarriage moves from its lowered state to its raised state.

This configuration, in which each slider-crank mechanism passes through its dead centre in the course of the displacement of the undercarriage is made possible due to the fact that the two dead centres do not coincide, as explained above.

The principal advantage of this configuration is that it enables the length of the gear compartment to be reduced whilst also reducing its height, and allowing an increase of the angular displacement $\theta$ traveled by the abovementioned undercarriage between its raised and lowered states.

In the preferred embodiment of the invention, phase shift angle $\phi$ is between 70 degrees and 100 degrees.

Such an angle indeed enables the effect of this phase shift to be maximised, and therefore enables the amplitude of the variations of the torque applied to the undercarriage by the abovementioned retraction means to be reduced optimally.

In particular, such an angle enables the respective dead centres of the two slider-crank mechanisms to be offset substantially, such that when one of the mechanisms passes through its dead centre, the other mechanism has a high leverage.

More generally, the large phase shift obtained in this manner, between the respective curves of the variations of the torques respectively applied by the two slider-crank mechanisms during the movement of the undercarriage, enables the variations of the total torque resulting from the addition of these two torques to be reduced optimally.

Abovementioned phase shift angle $\phi$ is, for example, equal to approximately 86 degrees.

The invention applies in a particularly advantageous manner to a landing gear compartment the undercarriage of which describes an angular displacement $\theta$ of more than 110 degrees when it passes from one to the other of its raised and lowered states.

The landing gear compartment can thus be particularly close to the forward end of the aircraft and/or include a landing gear including an undercarriage of the retractable type, i.e. having a leg of variable length.

In the preferred embodiment of the invention, the landing gear of the abovementioned landing gear compartment also includes a breaker strut according to the first and/or second aspect of the invention.

The landing gear compartment can thus optimally be made more compact, as explained above.

The invention also concerns an aircraft nose cone, including a landing gear compartment of a type described above.

The invention also concerns an aircraft including a landing gear compartment of a type described above, or a nose cone of the type described above.

BRIEF DESCRIPTION OF THE DRAWINGS

The invention will be better understood, and other details, advantages and characteristics of it will appear, on reading the following description given as a non-restrictive example, and with reference to the appended illustrations, in which:

FIG. 1, which has already been described, is a partial diagrammatic side view of a landing gear of a known type, illustrating said gear in its raised and lowered states;

FIG. 2, which has already been described, is a partial perspective diagrammatic view of the landing gear of FIG. 1 in its lowered state;

DETAILED DESCRIPTION

Figure 8:
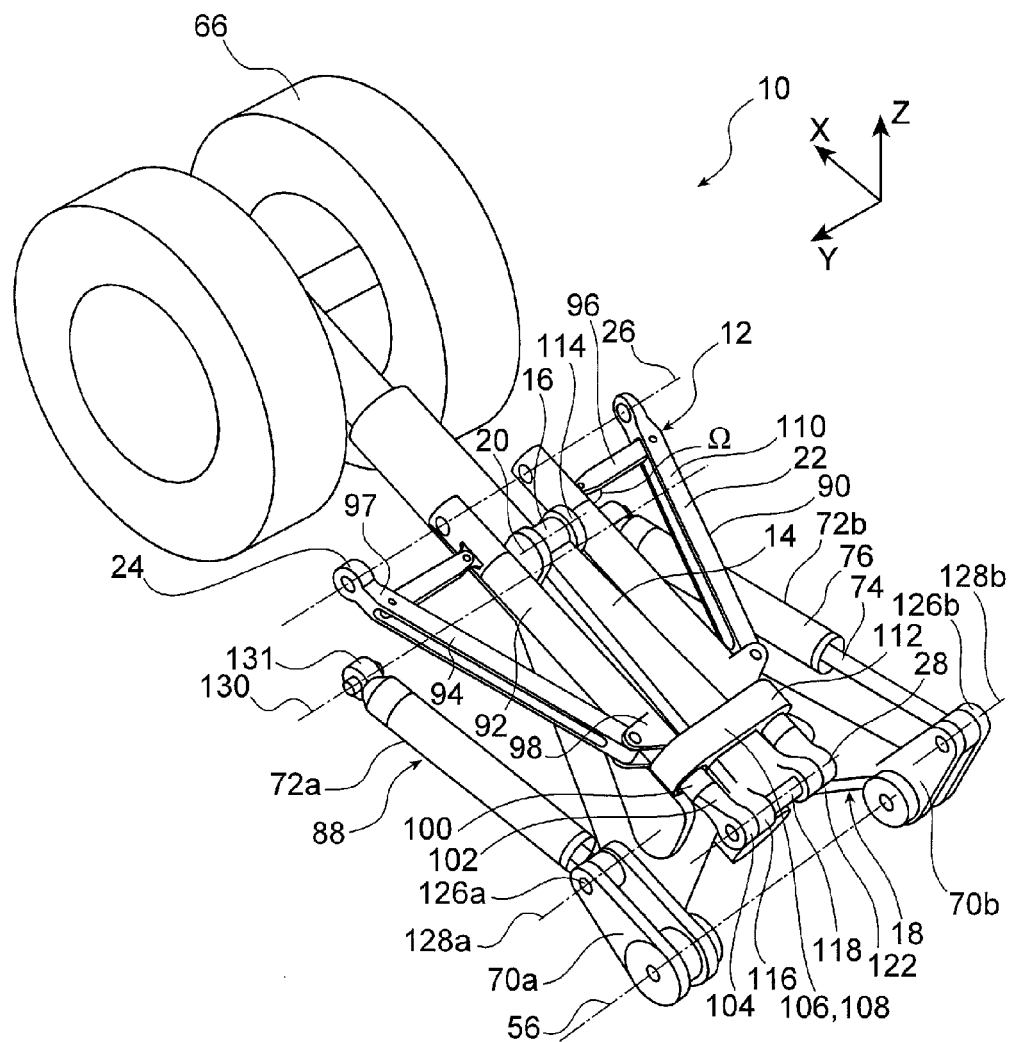
FIG. 8 is a partial perspective diagrammatic view of a landing gear according to a preferred embodiment of the invention, illustrating said landing gear in its raised state.
Figure 9:
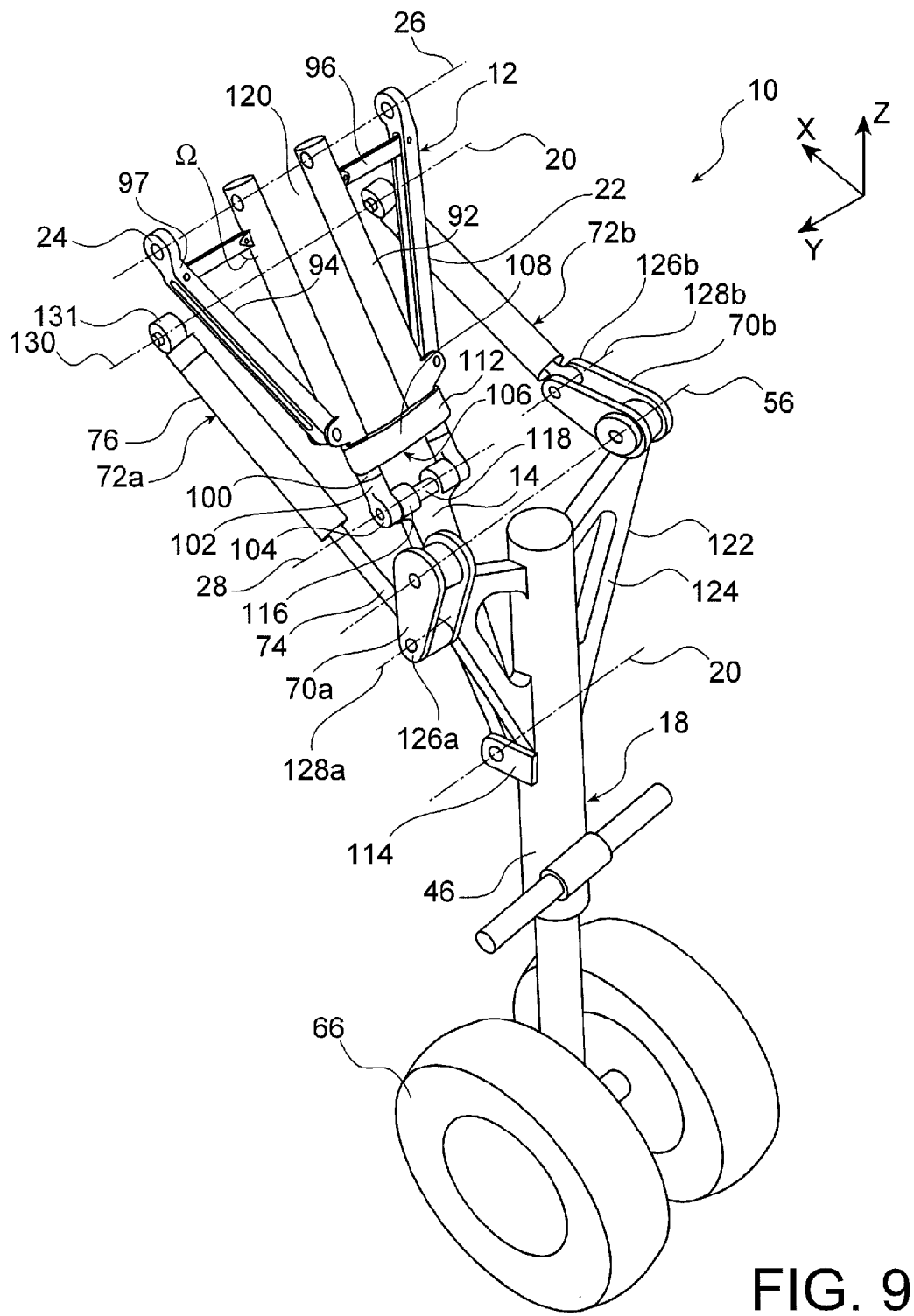
FIG. 9 is a partial perspective diagrammatic view of the landing gear of FIG. 8, illustrating said landing gear in its lowered state.

FIGS. 8 and 9 illustrate a landing gear 10 notably including an undercarriage 18 which can be rotated around a pivot axis 56 between a raised state (FIG. 8) and a lowered state (FIG. 9), means of retraction 88 of this undercarriage 18, together with a breaker strut 12, intended to stabilise undercarriage 18 in its lowered state.

It should be noted that landing gear 10 is contained in the forward gear compartment of an aircraft relative to which compartment the raised and lowered states of landing gear 10 are defined, but only this landing gear is represented in FIGS. 8 and 9.

In the whole of the following description, by convention, X refers to the longitudinal direction of the aircraft, Y to the transversal direction thereof, and Z to the vertical direction or height, where these three directions X, Y and Z are mutually orthogonal.

Breaker strut 12 is formed from a lower portion 14 and an upper portion 22, connected to leg 46 of undercarriage 18 about a first hinge axis 20, to the aircraft by a second hinge axis 26, and to one another by a third hinge axis 28, in a manner comparable to that which was described above with reference to FIGS. 1 to 4.

Breaker strut 12 of FIGS. 8 and 9 is distinguished, however, from breaker strut 12 of FIGS. 1 to 4 in that its upper portion 22 is in accordance with the first aspect and with the second aspect of the present invention, as will be more clearly apparent in what follows.

The upper portion 22 is formed from two roughly triangular structures 90 positioned symmetrically relative to a median vertical plane of landing gear 10.

Each of these structures 90 is formed essentially by the assembly of a longitudinal arm 92, an oblique arm 94, and a transverse arm 96, the latter taking the form of a connecting rod.

These elements are connected to one another by axes which are roughly orthogonal to the plane defined by second hinge axis 26 and by third hinge axis 28 of strut 12.

More precisely, longitudinal arm 92 and oblique arm 94 each has an end 97 having first hinge means 24 for articulated connection to the aircraft, and they are connected to one another in proximity to these hinge means 24 by transverse arm 96 to which they are assembled. In the illustrated example, transverse arm 96 defines a right angle Ω with longitudinal arm 92. In addition, the other end of oblique arm 94 is connected to longitudinal arm 92 in proximity to the other end of the latter, so as to define, roughly, a lower apex 98 of structure 90.

Longitudinal arm 92 of each structure 90 includes at this other end a hydraulic linear actuator 100, having a sliding rod 102 extending said end of the longitudinal arm 92. Said sliding rod 102 has an eye 104 for connection to lower portion 14 of strut 12. It should be noted that the cylinder of actuator 100 is accommodated within longitudinal arm 92, but as a variant this cylinder can itself form longitudinal arm 92. The amplitude of translational motion of sliding rod 102 of each of actuators 100 is typically equal to several centimeters, for example 4 cm.

Both actuators 100 are connected to controlled locking/unlocking means (not represented), capable of alternately allowing and preventing the displacement of sliding rod 102 of each of these actuators 100. In the example described, in which actuators 100 are of the hydraulic type, the abovementioned means include a hydraulic circuit which mutually connects the two chambers of each of actuators 100, and which includes a valve which is open in unlocking mode, so as to allow an exchange of fluid between said chambers, and which is closed in locking mode, to close the circuit, and therefore prevent such an exchange of fluid. These elements, which can be of a conventional type, will not be described in greater detail here.

It should be noted that actuators 100 do not operate in an active way. This means that actuators 100 do not generate a motion, but only allow or prevent a passive motion of sliding rod 102 driven by the motion of undercarriage 18.

Upper portion 22 of strut 12 therefore includes both structures 90, which are separated from one another, and are positioned either side of median vertical plane XZ of landing gear 10. This upper portion also includes a flange 106 connecting both structures 90 to one another. This flange 106 includes a lengthened flat median portion 108 extending in the area of upper face 110 of upper strut portion 22, as well as sleeves 112 respectively surrounding longitudinal arms 92 of both structures 90, at both opposite ends of the median portion 108.

Lower portion 14 of strut 12 globally takes the form of a connecting rod having at its lower end an eye 16 (FIG. 8) connected to a fork joint 114 formed on leg 46 of undercarriage 18, where this eye thus constitutes first hinge means in the terminology of the present invention.

At its upper end, the lower portion of strut 14 has two eyes 116 (FIG. 8) connected to the respective eyes 104 of actuators 100 of structures 90 of the strut upper portion 22, through hinge pin 118.

The two eyes 116 of the upper end of the lower portion of strut 14 constitute second hinge means for articulated connection of lower portion 14 to upper portion 22 of strut 12, in the terminology of the present invention. Similarly, the two respective eyes 104 of actuators 100 constitute second hinge means for articulated connection of upper portion 22 to lower portion 14 of strut 12.

It should be noted that the abovementioned linear actuators 100 form means of attachment of the first hinge means 24 of the upper portion of strut 22 to second hinge means 104 thereof. As explained above, the actuators allow the distance separating the abovementioned first and second hinge means 24 and 104 to be adjusted as strut 12 moves from one to the other of its folded (FIG. 8) and deployed (FIG. 9) positions, in accordance with the first aspect of the invention. Such an adjustment enables strut 12 to be prevented from locking as it moves.

As can be seen in FIGS. 8 and 9, both structures 90 of the strut upper portion 22 delimit a space 120 (FIG. 9) forming a recess for lower portion 14 in the folded position (FIG. 8). In this position, first hinge axis 20 is contained in the plane defined by second hinge axis 26 and by third hinge axis 28, in accordance with the second aspect of the invention.

The combination of the first and second aspects of the invention thus allows both portions 14 and 22 of breaker strut 12 to be nested in the folded position along leg 46 of undercarriage 18, which results in optimum compactness of this breaker strut 12.

Means of retraction 88 of undercarriage 18 of landing gear 10 will now be described. As described above, such an undercarriage is installed such that it rotates around a pivot axis 56 defined relative to the aircraft. The connection of undercarriage 18 to the aircraft around this pivot axis 56 can be of a conventional type. This connection is not represented in the appended figures, and will not be described here.

As shown by FIG. 9, leg 46 of undercarriage 18 includes a structure 122 taking the form of two triangles 124 positioned either side of leg 46. This structure 122 thus has two upper side apexes, supporting respectively two cranks, respectively left-hand crank 70a and right-hand crank 70b.

Each of these cranks 70a and 70b has a respective crank pin 126a, 126b which is off-centre relative to pivot axis 56 of undercarriage 18.

Landing gear 10 also includes two linear actuators 72a and 72b which are similar to one another, each having a movable rod 74 connected to crank pin 126a, 126b of corresponding crank 70a, 70b, by a corresponding hinge axis 128a, 128b which is parallel to pivot axis 56 of undercarriage 18. In addition, respective cylinders 76 of actuators 72a, 72b are connected to one or more structural elements of the aircraft by a common hinge axis 130, which is therefore defined in fixed terms relative to the aircraft. These cylinders 76 are connected to the aircraft by means of attachment, for example taking the form of eyes 131.

Each pair formed by one of cranks 70a and 70b and by corresponding actuator 72a, 72b therefore constitutes a mechanism of the slider-crank type.

Figure 10:
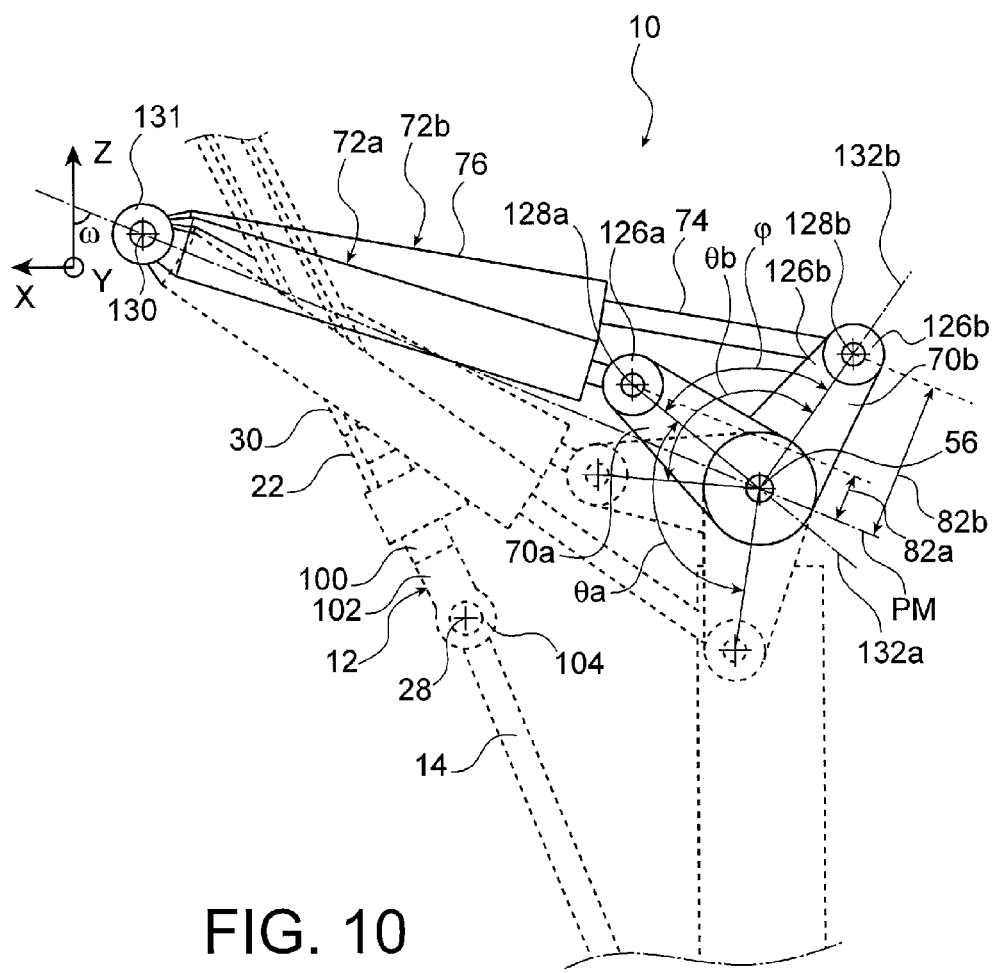
FIG. 10 is a partial diagrammatic side view, on a larger scale, of the landing gear of FIG. 8, illustrating the kinematic of the retraction means of said landing gear.

As suggested by FIGS. 8 and 9, and as is shown more clearly in FIG. 10, the two cranks 70a and 70b are offset relative to one another by an angle $\phi$ around pivot axis 56. This must be understood to mean that lines 132a and 132b, which are orthogonal to pivot axis 56 and which connect this pivot axis respectively to the centres of respective crank pins 126a, 126b of the two cranks, form the abovementioned angle $\phi$. This angle is preferentially between 70 degrees and 100 degrees and is, for example, equal to 86 degrees in the described embodiment.

As a result the two slider-crank mechanisms are phase-shifted by said angle $\phi$. Respective angular displacements $\theta a$, $\theta b$ of the two cranks 70a, 70b are consequently offset relative to one another by angle $\phi$. These angular displacements are of course of an angle equal to angle $\theta$ of the angular displacement of the undercarriage when it passes from one to the other of its raised and lowered states.

As illustrated in FIG. 10, phase shift angle $\phi$ enables leverages 82a, 82b, which are associated respectively with the two slider-crank mechanisms, to vary in a phase-shifted manner, such that when one of these leverages is low the other is high, and vice versa.

Figure 3:
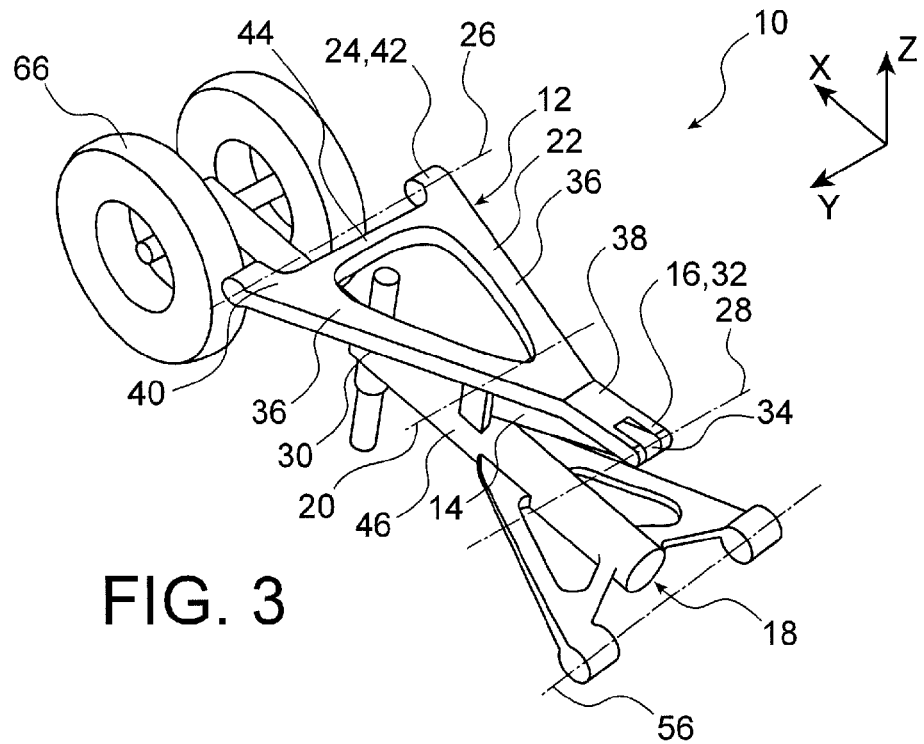
FIG. 3, which has already been described, is a partial perspective diagrammatic view of the landing gear of FIG. 1 in its raised state.
Figure 4:
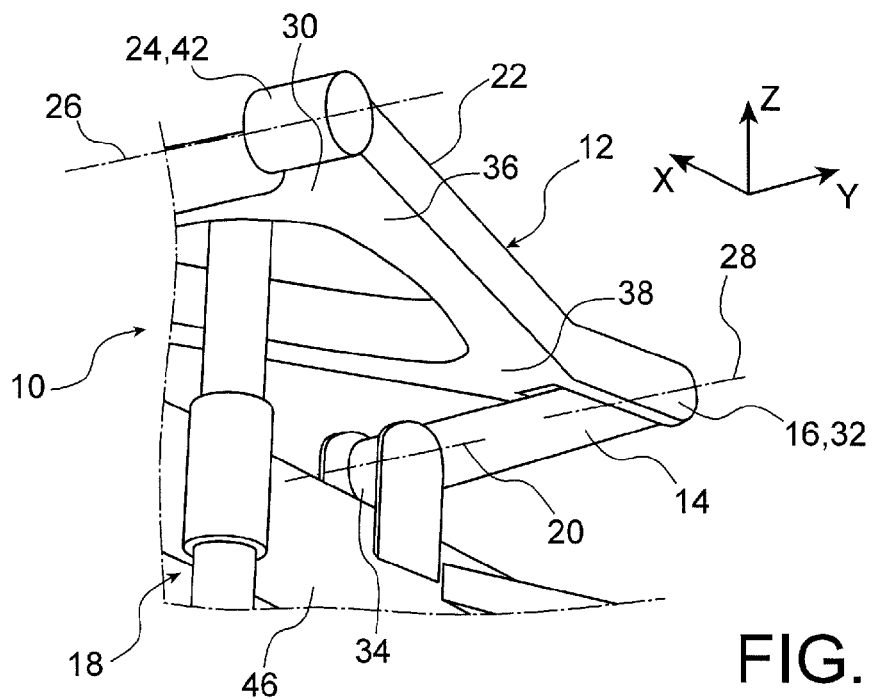
FIG. 4, which has already been described, is a partial perspective diagrammatic view on a larger scale of the landing gear of FIG. 1 in its raised state.
Figure 5:
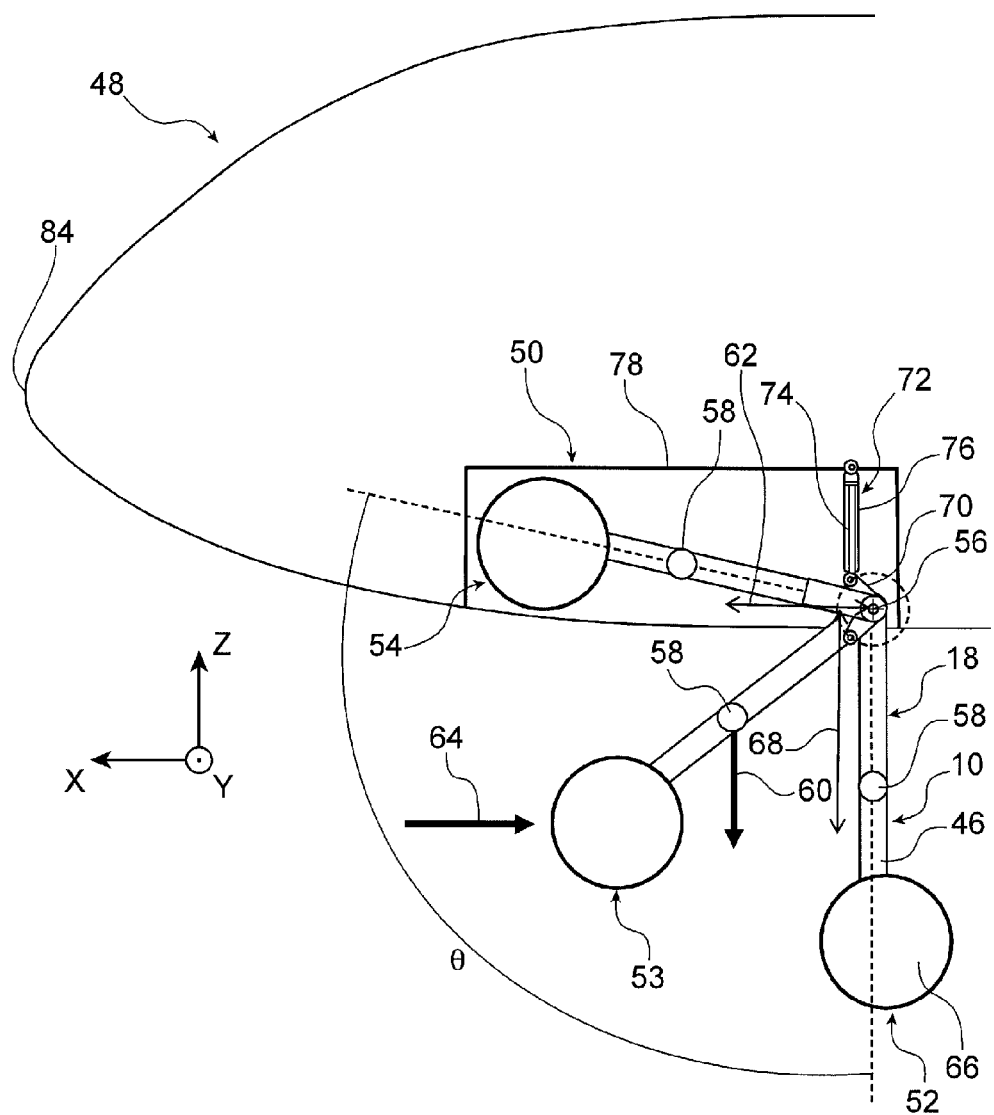
FIG. 5, which has already been described, is a partial longitudinal section diagrammatic view of an aircraft nose cone, illustrating more particularly the forward landing gear compartment.
Figures 6A, 6B, 6C:
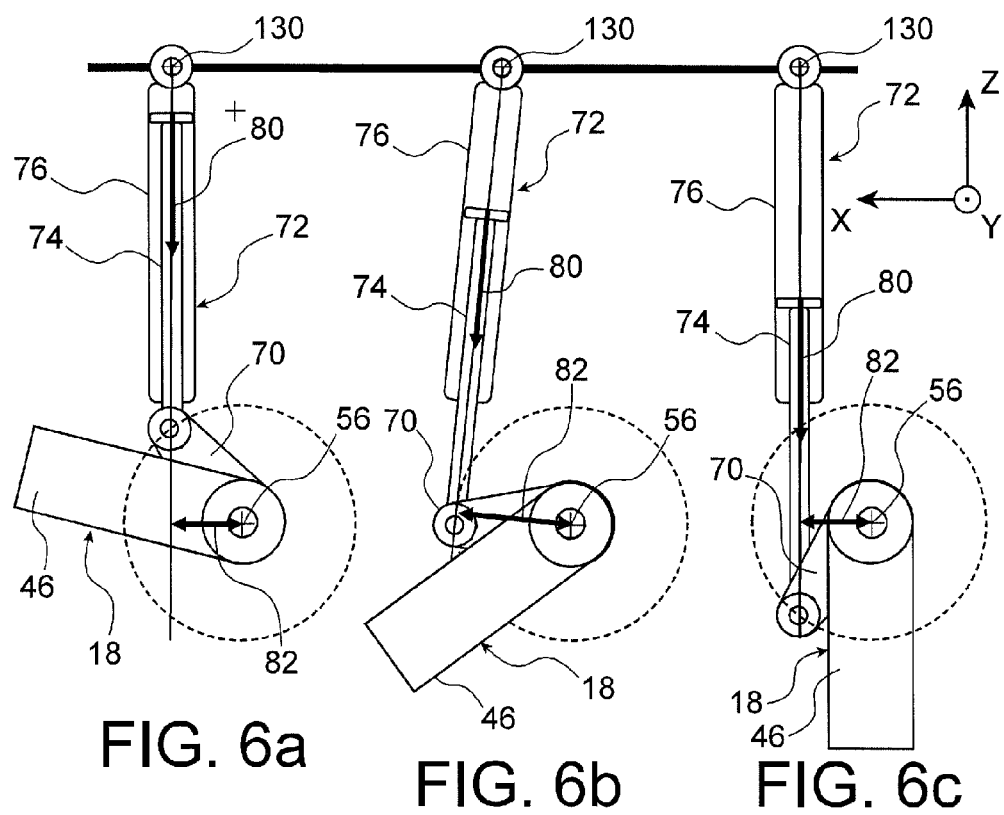
FIGS. 6a, 6b and 6c, which have already been described, are partial longitudinal section diagrammatic views, on a larger scale, of the aircraft nose cone of FIG. 5, illustrating means of retraction of the landing gear of said landing gear compartment, respectively in raised, intermediate and lowered states, of this landing gear.
Figure 7:
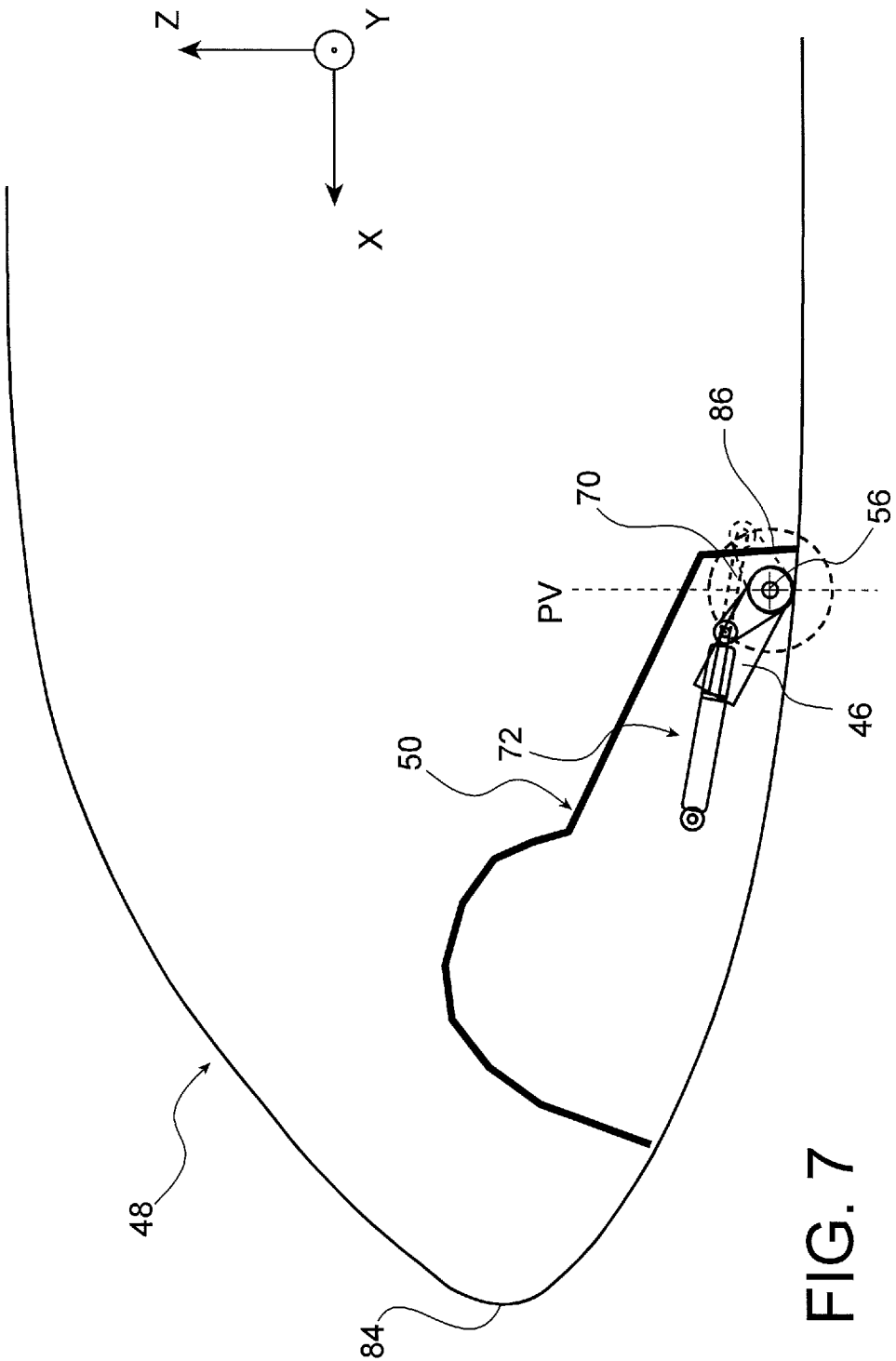
FIG. 7, which has already been described, is a partial longitudinal section diagrammatic view of an aircraft nose cone including a forward landing gear which is very close to the front end of the aircraft.

The phase shift of the curve of abovementioned leverages 82a and 82b enables the amplitude of the variations of torque C(a+b) applied by means of retraction 88 of undercarriage 18 to be reduced substantially as this undercarriage moves, relative to torque C obtained with the retraction means of a known type represented in FIG. 5. Torque C(a+b) is of course equal to the sum of torques C(a) and C(b) applied respectively by each of the two slider-crank mechanisms described above, and therefore to the product of the roughly constant force developed by each of linear actuators 72a and 72b multiplied by the sum of abovementioned leverages 82a and 82b.

Figure 11:
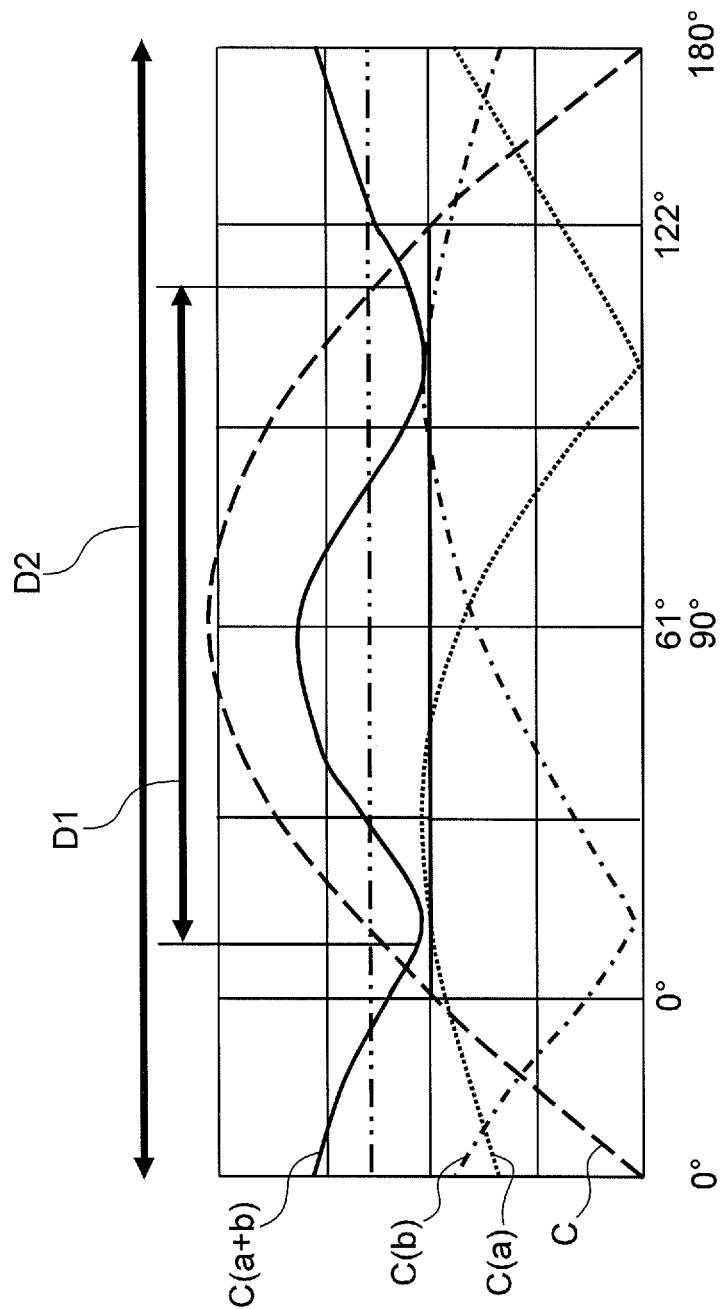
FIG. 11 is a graph principally illustrating the retraction torque applied to the undercarriage of the landing gear of FIG. 8 by said retraction means, together with the retraction torque in the case of the landing gear of FIG. 5, during the angular displacement of each undercarriage.

The smoothing of the global torque C(a+b) can be seen clearly from the graph of FIG. 11, which illustrates the variation of the abovementioned torques C(a+b) and C, together with that of torques C(a) and C(b) relative to each of the two slider-crank mechanisms.

Whereas the angular displacement of undercarriage 18 is limited in landing gears of known types to angles $\theta$ within a range D1 limited to approximately 105 degrees, according to its third aspect the invention therefore enables this angular displacement to be extended to a range D2 of angles $\theta$ which can be as high as 180 degrees.

Furthermore, as illustrated in FIG. 10, the phase shifting of the curve of abovementioned leverages 82a and 82b makes it possible to use a configuration in which each slider-crank mechanism passes through a dead centre. In a well-known manner, such a dead centre is manifested when crank pin 126a, 126b of corresponding crank 70a, 70b traverses a plane PM including pivot axis 56 of undercarriage 18 and common hinge axis 130 connecting the two linear actuators 72a, 72b to the aircraft. This results in the possibility of positioning both actuators 72a and 72b aligned in a direction close to the horizontal direction, without however having a detrimental effect on the compactness of the landing gear towards the rear (i.e. towards the right in FIG. 10). Positioning of the linear actuators aligned in a direction close to horizontal must be understood to mean that abovementioned plane PM can form an angle $\omega$ of more than 45 degrees, and preferably greater than 60 degrees, with vertical direction Z, corresponding to the general direction of the undercarriage in its lowered state.

The retraction of undercarriage 18 of landing gear 10 will now be described.

Such a retraction is activated by the actuation of the two linear actuators 72a and 72b, causing both abovementioned slider-crank mechanisms to rotate. This rotation is accompanied by a folding back of lower portion 14 of breaker strut 12 towards lower face 30 of upper portion 22 of this breaker strut.

In a first phase of this retraction, linear actuators 100 of upper portion 22 of breaker strut 12 are kept in locking mode so that the displacements of their respective sliding rods 102 are locked by the abovementioned locking/unlocking means.

Subsequently, at a predetermined stage of this displacement, said locking/unlocking means are ordered to unlock both actuators 100, and thus release the movement of respective sliding rods 102 of these actuators relative to their respective cylinders.

The length of upper portion 22 of breaker strut 12 is then slightly modified, by a movement of sliding rods 102 of actuators 100 under the effect of the forces applied to lower portion 14 of the strut by undercarriage 18 driven by means of retraction 88, so as to allow the folding kinematic of strut 12 to continue.

When the retraction is complete, lower portion 14 of strut 12 is accommodated in space 120 such that it is then nested with upper portion 22 of strut 12.

The lowering of undercarriage 18, from its raised state to its lowered state, is accomplished with the same steps, but in reverse order.

It should be noted that the configuration of the cranks 70a, 70b and of the associated linear actuators 72a, 72b is only one example of a slider-crank mechanism among many available possibilities in connection with the present invention.

Thus, each mechanism can, for example, include an additional connecting rod linking, in a well-known articulated manner, the crank of the mechanism to the associated actuator so as to form a mechanism in which the actuator cylinder is rigidly attached to the aircraft such that the movement of the actuator rod is a pure translational motion relative to the aircraft's reference system. In this case, means of attachment 131 of the cylinder of each actuator 72a, 72b to the aircraft are designed for a connection with a zero degree of freedom.

As a variant, the phase shifting of the two slider-crank mechanisms may be obtained by positioning both actuators 72a, 72b aligned in two different directions, where cranks 70a and 70b may then coincide around pivot axis 56, i.e. not be angularly offset. In such a configuration, the two slider-crank mechanisms are characterised by two respective planes PM inclined relative to one another by phase shift angle $\phi$.

Figure 12:
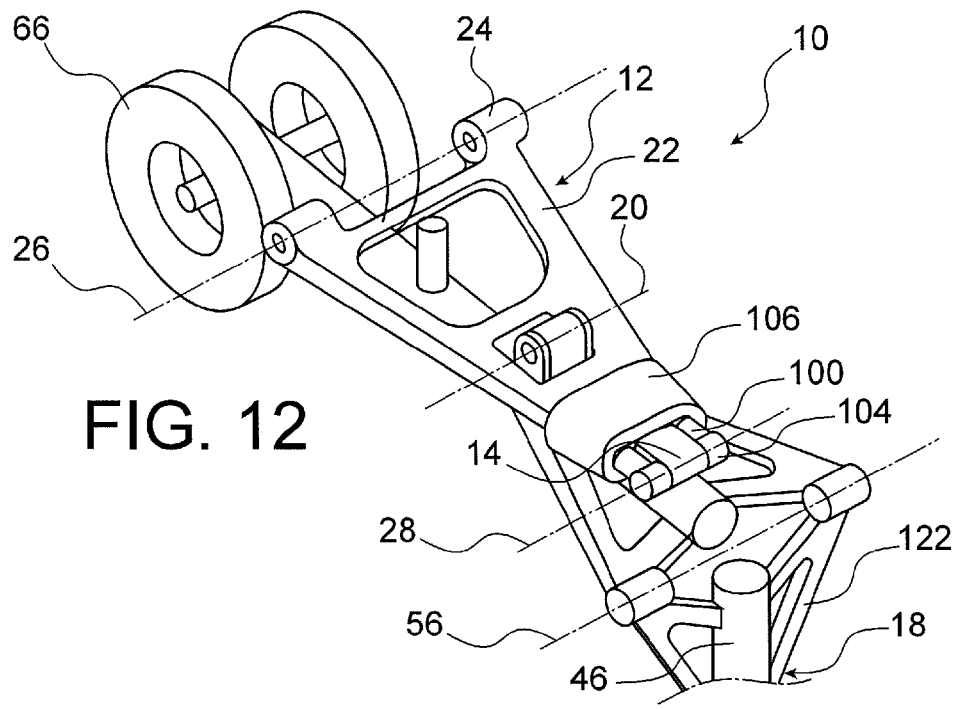
FIGS. 12 and 13 are partial perspective diagrammatic views of aircraft landing gears, respectively according to two other embodiments of the invention.

FIG. 12 illustrates a portion of a landing gear 10 according to another embodiment of the invention, in which breaker strut 12 is in accordance with the first aspect and with the second aspect of the invention, but differs from the strut described above in that its upper portion 22 is formed from a single A-shaped structure which is globally comparable to the one fitted to the strut of known type of FIGS. 1 to 4, but which has two linear actuators 100 and a flange 106 surrounding the cylinders of these two actuators. Linear actuators 100 are connected to the strut lower portion 14 in a manner comparable to what was described above in reference to FIGS. 8 to 10. In addition, the strut upper portion 22 delimits a space forming a recess for the lower portion in the folded position in a manner similar to what was described above.

Furthermore, the preferred embodiment represented in FIGS. 8 to 10 combines the three aspects of the invention so as to obtain an optimum result in terms of compactness of the landing gear and of volume of the gear compartment containing it.

Naturally, use may be made of each of these three aspects without the other two aspects, or only with one of the other two aspects, of the invention, without going beyond the scope of the present invention.

Figure 13:
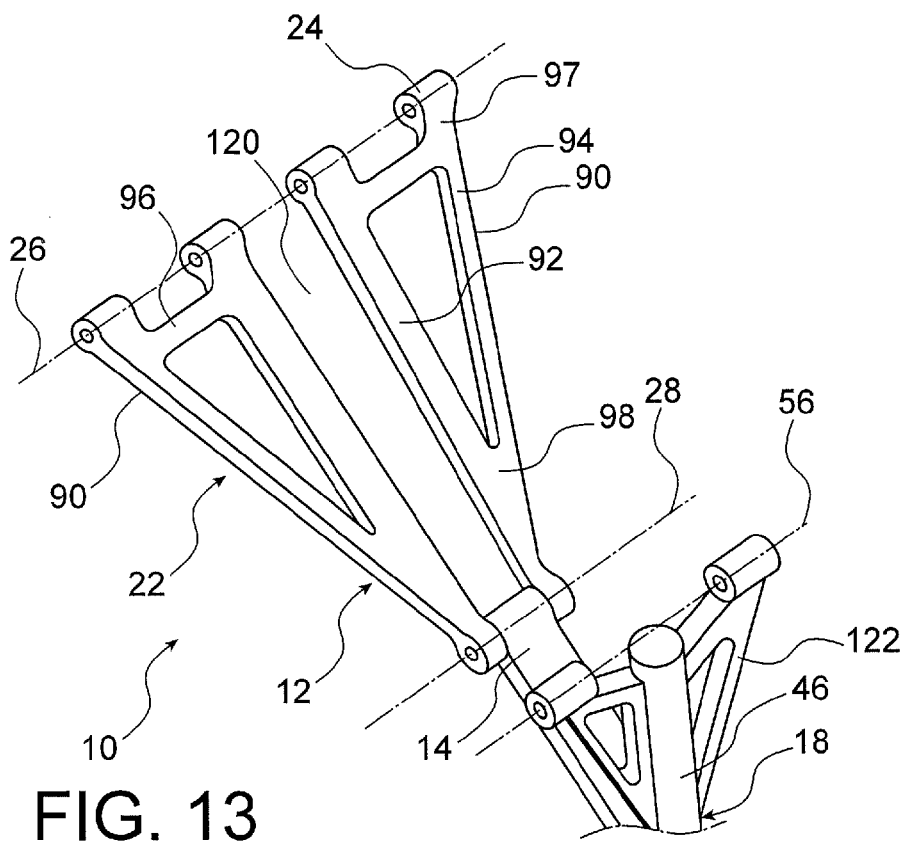

FIG. 13 thus illustrates a portion of a landing gear 10 according to another embodiment, in which breaker strut 12 is in accordance with the second aspect of the invention, but not with its first aspect. As a consequence, the upper portion of strut 22 is formed from two structures 90 of a shape comparable to that of structures 90 described above with reference to FIGS. 8 to 10, but each manufactured as a single part, and not therefore having length-adjusting actuators.

The invention claimed is:

1. A breaker strut for an aircraft landing gear, the breaker strut comprising:
   two portions;
   wherein a lower one of the two portions includes an eye for articulated connection to a landing gear undercarriage about a first hinge axis;
   wherein an upper one of the two portions includes a first hinge for articulated connection to at least one structural aircraft element about a second hinge axis;
   wherein the two portions are connected to one another by a second respective hinge about a third hinge axis parallel to the first and second hinge axes, such that the lower and upper portions are moved relative to one another between:
      a deployed position, in which the lower and upper portions are positioned on either side of the third hinge axis, such that the first hinge axis is contained in a plane defined by the second and third hinge axes, and
      a folded position, in which the lower portion is folded towards a lower face of the upper portion; and
   wherein at least one of the lower and upper portions of the breaker strut includes a mechanism of mutual attachment of the eye and the second hinge and the first and second hinges, respectively, which allows a distance separating the eye and second hinge and the first and second hinges, respectively, to be modified.

2. The breaker strut according to claim 1, wherein the mechanism of mutual attachment comprises at least one sliding rod, together with controlled locking and unlocking mechanisms for preventing and/or allowing motion of the sliding rod so as to lock and/or unlock the distance separating the first and second hinges.

3. A landing gear for an aircraft, comprising the at least one undercarriage which is moved between a raised state and a lowered state, together with the breaker strut according to claim 1, wherein the eye of the lower portion of the breaker strut is connected to the undercarriage.

4. An aircraft landing gear compartment accommodating the landing gear according to claim 3, the aircraft landing gear compartment comprising the at least one structural aircraft element to which the first hinge of the upper portion of the breaker strut is connected.

5. An aircraft, including the landing gear compartment according to claim 4.

6. A breaker strut for an aircraft landing gear, the breaker strut comprising:
   two portions;
   wherein a lower one of the two portions includes an eye for articulated connection to a landing gear undercarriage about a first hinge axis;
   wherein an upper one of the two portions includes a first hinge for articulated connection to at least one structural aircraft element about a second hinge axis;
   wherein the two portions are connected to one another by a second respective hinge about a third hinge axis parallel to the first and second hinge axes, such that the lower and upper portions are moved relative to one another between:
      a deployed position, in which the lower and upper portions are positioned on either side of the third hinge axis, such that the first hinge axis is roughly contained in a plane defined by the second and third hinge axes, and
      a folded position, in which the lower portion is folded towards a lower face of the upper portion, such that the first hinge axis is contained in the plane defined by the second and third hinge axes; and
   wherein the upper portion defines a space enabling the lower portion to be accommodated in the folded position.

7. The breaker strut according to claim 6, wherein the upper portion comprises two structures which globally have a shape of a triangle, the structures being connected respectively to either side of the lower portion, and where each of the structures comprises, at a lower apex of the triangle, the second hinge connecting the upper portion to the lower portion, and at two upper apexes of the triangle, the first hinge connecting the upper portion to the structural aircraft element.

8. The breaker strut according to claim 7, wherein the upper portion comprises a flange connecting the structures to one another.

9. The breaker strut according to claim 7, wherein each of the structures comprises an arm delimiting the space, and extending in a direction orthogonal to the first, second and third hinge axes so as to connect the lower apex to one of the other two apexes of the triangle.

10. The breaker strut according to claim 9, wherein the space traverses the upper portion so as to emerge in the lower face and in an upper face of the upper portion, and the space extends along an entire length of the arm so as to separate the structures.

11. A landing gear for an aircraft, the landing gear comprising the at least one undercarriage which is moved between a raised state and a lowered state, together with the breaker strut according to claim 6, wherein the eye of the lower portion of the breaker strut is connected to the undercarriage.

12. An aircraft landing gear compartment accommodating the landing gear according to claim 11, the aircraft landing gear compartment comprising the at least one structural aircraft element to which the first hinge of the upper portion of the breaker strut is connected.

13. An aircraft, comprising the landing gear compartment according to claim 12.

14. A breaker strut for an aircraft landing gear, the breaker strut comprising:
   two portions;

wherein a lower one of the two portions includes an eye for articulated connection to a landing gear undercarriage about a first hinge axis;

wherein an upper one of the two portions includes a first hinge for articulated connection to at least one structural aircraft element about a second hinge axis;

wherein the two portions are connected to one another by a second respective hinge about a third hinge axis parallel to the first and second hinge axes, such that the lower and upper portions are moved relative to one another between:
- a deployed position, in which the lower and upper portions are positioned on either side of the third hinge axis, such that the first hinge axis is contained in a plane defined by the second and third hinge axes, and
- a folded position, in which the lower portion is folded towards a lower face of the upper portion, such that the first hinge axis is contained in the plane defined by the second and third hinge axes;

wherein at least one of the lower and upper portions of the breaker strut includes a mechanism of mutual attachment of the eye and the second hinge and the first and second hinges, respectively, which allows a distance separating the eye and second hinge and the first and second hinges, respectively, to be modified, and wherein the upper portion defines a space enabling the lower portion to be accommodated in the folded position.

15. A landing gear for an aircraft, the landing gear comprising:
   an undercarriage; and
   a retraction mechanism of the undercarriage for rotating the undercarriage around a pivot axis;
   wherein the retraction mechanism comprises a first crank securely attached to the undercarriage, and a first linear actuator which includes a first portion coupled to the first crank and a second portion able to move relative to the first portion and having a mechanism of attachment for attaching the second portion to a structural aircraft element such that the first crank and the first linear actuator form part of a first slider-crank mechanism;
   wherein the retraction mechanism comprises a second crank securely attached to the undercarriage, and a second linear actuator which includes a first portion coupled to the second crank and a second portion able to move relative to the first portion and having a mechanism of attachment for attaching the second portion to a structural aircraft element such that the second crank and the second actuator form part of a second slider-crank mechanism; and
   wherein the first and second slider-crank mechanisms are phase-shifted relative to one another by a non-zero angle $\phi$ defined around the pivot axis.

16. A landing gear according to claim 15, wherein the second crank is offset, relative to the first crank, by the angle $\phi$.

17. The landing gear according to claim 16, wherein the first portion of each of the linear actuators is directly connected to the corresponding crank about a hinge axis parallel to the pivot axis, and the mechanism of attachment of the second portion of each of the linear actuators allow rotation of the second portion about a hinge axis parallel to the pivot axis, and
   wherein the linear actuators are similar, and the respective second portions of the linear actuators are connected to the structural aircraft elements about a common hinge axis.

18. The landing gear according to claim 15, wherein the angle $\phi$ is between 70 degrees and 100 degrees.

19. An aircraft landing gear compartment accommodating the landing gear according to claim 15,
   wherein the second portion of the first linear actuator is attached to a first structural element of the landing gear compartment, and
   wherein the second portion of the second linear actuator is attached to a second structural element of the landing gear compartment.

20. An aircraft, including the landing gear compartment according to claim 19.

* * * * *